Figure 1:
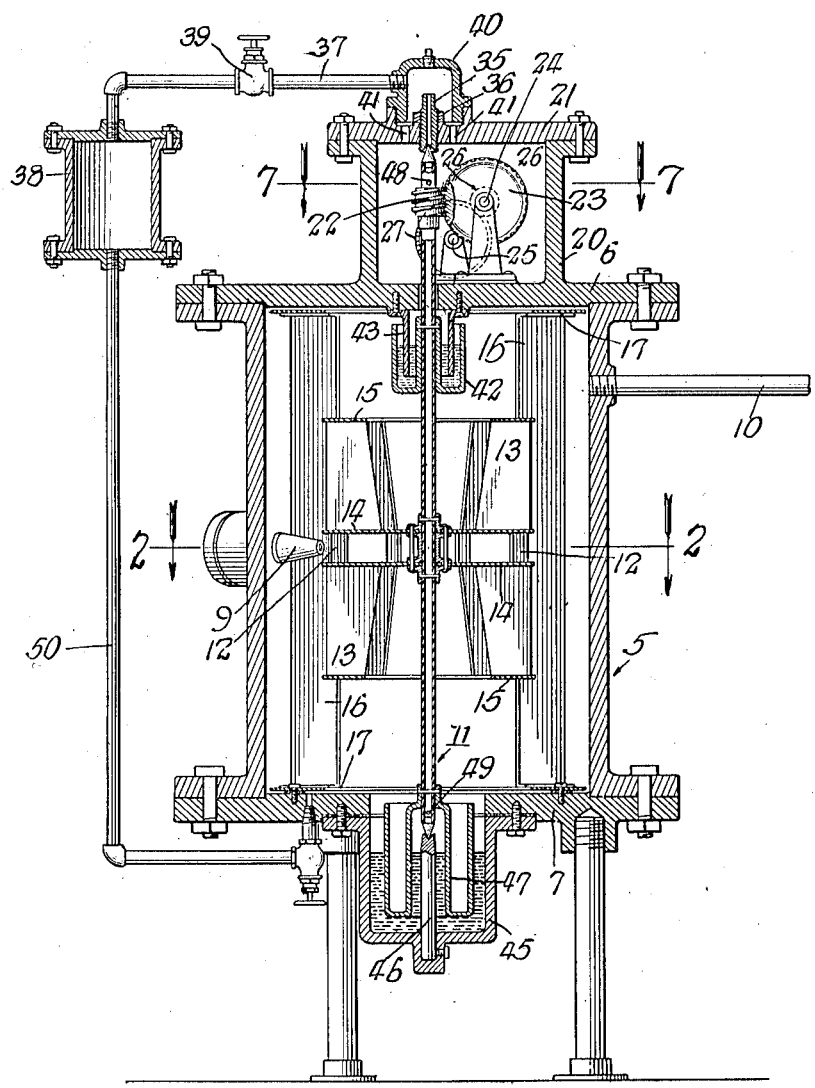

E. P. COLEMAN, DEC'D.
R. H. COLEMAN, ADMINISTRATOR.
FLUID METER.
APPLICATION FILED JULY 6, 1909.

1,020,127.

Patented Mar. 12, 1912.

6 SHEETS—SHEET 2.

Witnesses:
T. H. Alfreds
G. R. Wilkins

Inventor
Edgar P. Coleman
by Poole & Brown Attys

E. P. COLEMAN, DEC'D.
R. H. COLEMAN, ADMINISTRATOR.
FLUID METER.
APPLICATION FILED JULY 6, 1909.
1,020,127.
Patented Mar. 12, 1912
6 SHEETS—SHEET 3.
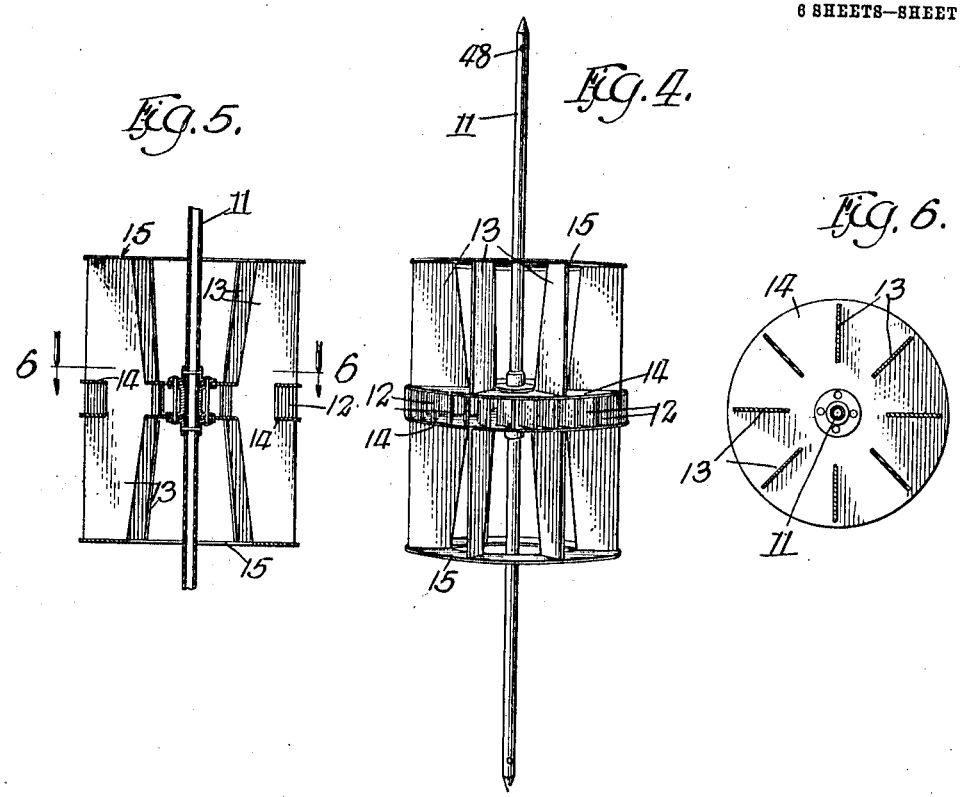
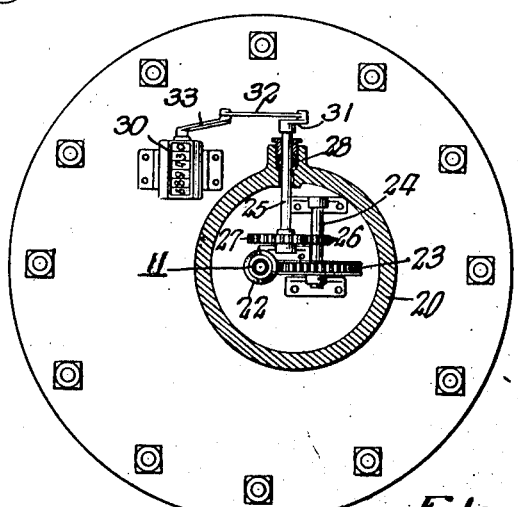
Witnesses:
P. H. Alfred
G. R. Wilkins
Inventor:
Edgar P. Coleman
by Poole & Brown Attys E. P. COLEMAN, DEC'D.
R. H. COLEMAN, ADMINISTRATOR.
FLUID METER.
APPLICATION FILED JULY 6, 1909.

1,020,127.

Patented Mar. 12, 1912.
6 SHEETS—SHEET 4.

Witnesses:
T. H. Alfred
G. R. Wilkins

Inventor:
Edgar P. Coleman
by Poole + Brown
Attys

E. P. COLEMAN, DEC'D.
R. H. COLEMAN, ADMINISTRATOR.
FLUID METER.
APPLICATION FILED JULY 6, 1909.

1,020,127.

Patented Mar. 12, 1912.

6 SHEETS—SHEET 5.

Witnesses:
J. H. Helfrids
G. R. Wilkins

Inventor
Edgar P. Coleman
by Poole & Brown
Attys

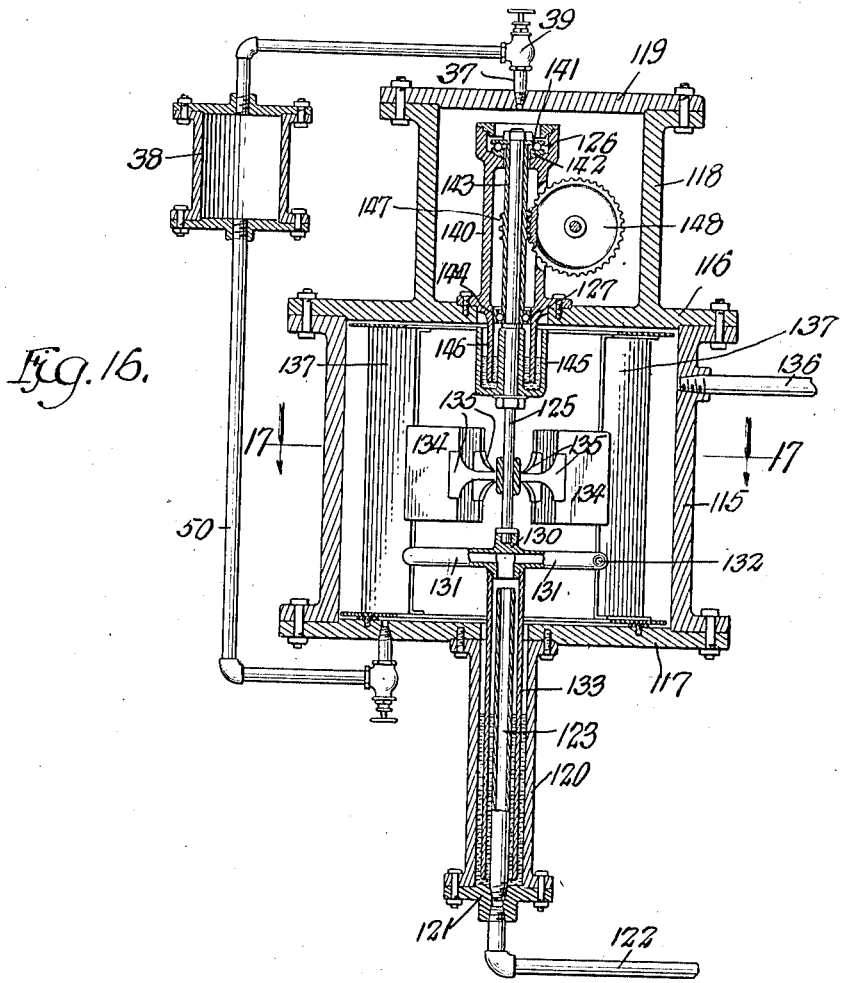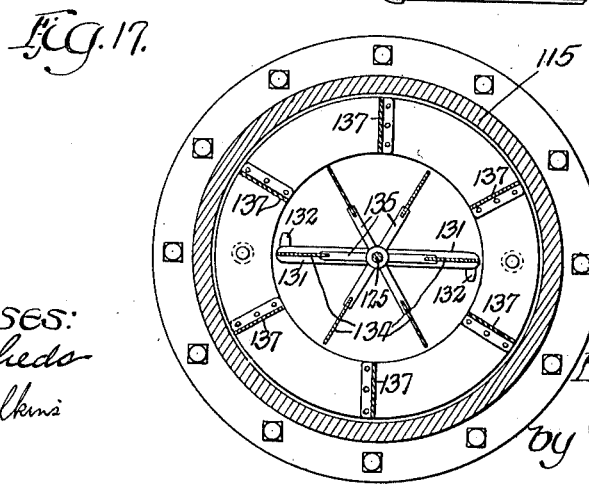

UNITED STATES PATENT OFFICE.

EDGAR P. COLEMAN, OF BUFFALO, NEW YORK; ROBERT H. COLEMAN ADMINISTRATOR OF SAID EDGAR P. COLEMAN, DECEASED.

FLUID-METER.

1,020,127.  Specification of Letters Patent.  Patented Mar. 12, 1912.

Application filed July 6, 1909. Serial No. 506,024.

*To all whom it may concern:*

Be it known that I, EDGAR P. COLEMAN, a citizen of the United States, and a resident of Buffalo, in the county of Erie and State of New York, have invented certain new and useful Improvements in Fluid-Meters, (Case B;) and I do hereby declare that the following is a full, clear, and exact description thereof, reference being had to the accompanying drawings, and to the letters of reference marked thereon, which form a part of this specification.

This invention relates to integrating meters for determining the quantity or volume of fluid, whether a liquid, vapor or gas, which passes through the apparatus during any unit of time, irrespective of the density or rate of flow of the fluid.

An apparatus embodying the main features of my invention embraces a motor-member which is rotatively mounted in a fluid-tight casing and is given movement by the impact or reaction of the fluid to be measured in the passage of the same through a nozzle or nozzles under the pressure-head of such fluid, and a resistance or load-member which is connected and turns with the rotative motor-member and is immersed in and acts on the fluid to be measured in a manner to afford a resistance torque which opposes or retards the torque of the motor-member, so that the latter turns or rotates at a moderate rate. The apparatus also includes a registering device which is driven by the motor-member and indicates the number of revolutions of the motor-member, and consequently the total volume or quantity of fluid that passes through the apparatus, in a given unit of time.

In the operation of a registering or integrating meter embracing the features set forth, the impact or reaction of the fluid to be measured in passing through the nozzles produces on the motor-member a motive torque effecting rotation of the same. The action of the rotative load-member in the fluid on which it acts produces a resisting torque which opposes the rotation of the motor-member, the said load-member being so arranged that the resisting torque opposes or counterbalances the motive torque to such extent as to afford a degree of power in the motor-member required for the positive and certain operation of the registering device and the rotation of said motor-member at a reasonable rate. The nozzles of the motor are so constructed as to have a constant coefficient of discharge, regardless of the pressure head or density of the fluid to be measured, with the result that the torque of the motor-member is substantially proportional to the square of the fluid velocity in the nozzle, while the opposing torque of the resistance member is proportional to the square of the speed of rotation of the same and of the motor-member. As a consequence, the speed of rotation is strictly proportional to the square root of the pressure-head of the fluid to be measured, and therefore directly proportional to the fluid flow. Moreover, by the use of suitable anti-friction bearings, the frictional resistance to the rotation of the moving parts is made so small as to be negligible, and the meter is therefore substantially accurate for all rates of flow within the usual range of the meter.

The apparatus illustrated in the accompanying drawings embraces the general features above set forth, and includes means for reducing or lessening the friction of rotation, including mercury seals for isolating from the fluid passing through the apparatus the lubricant employed to lessen friction, a reservoir for lubricant in connection with passages for equalizing the pressure in the said reservoir and the casing of the apparatus together with devices by which the weight of the rotating parts is sustained by flotation on a heavy liquid, such as mercury.

Figure 2:
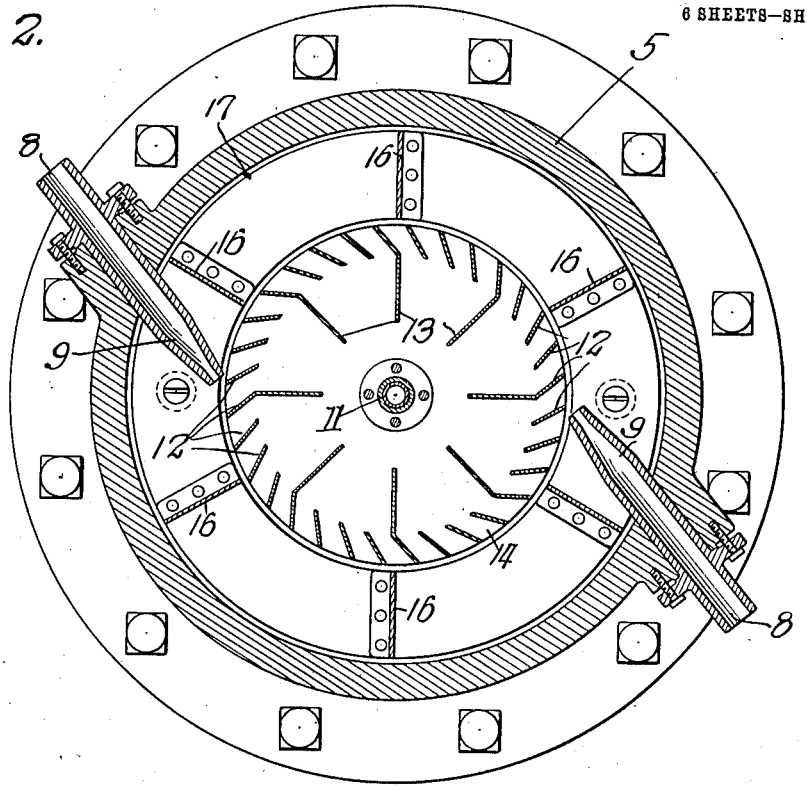
Figure 3:
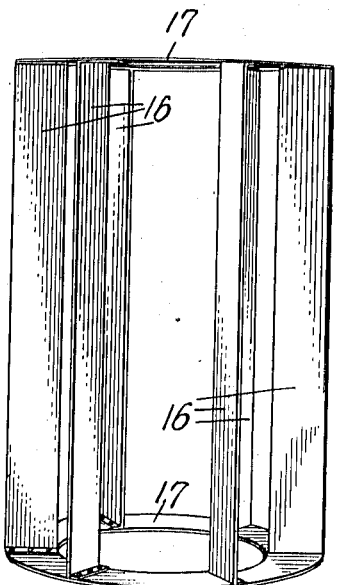
Figure 8:
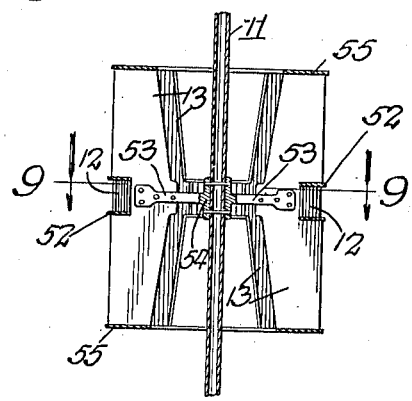
Figure 9:
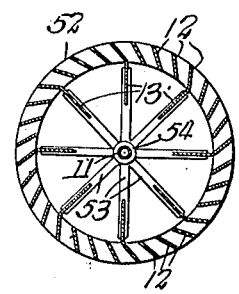
Figure 10:
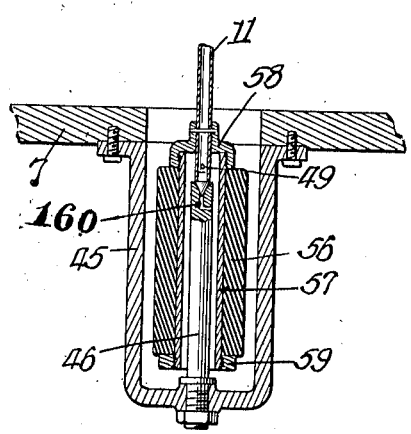
Figure 11:
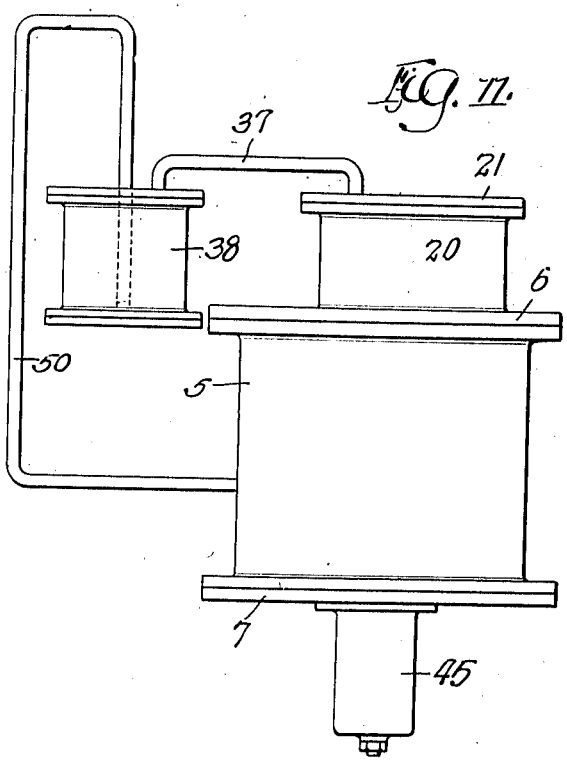
Figure 12:
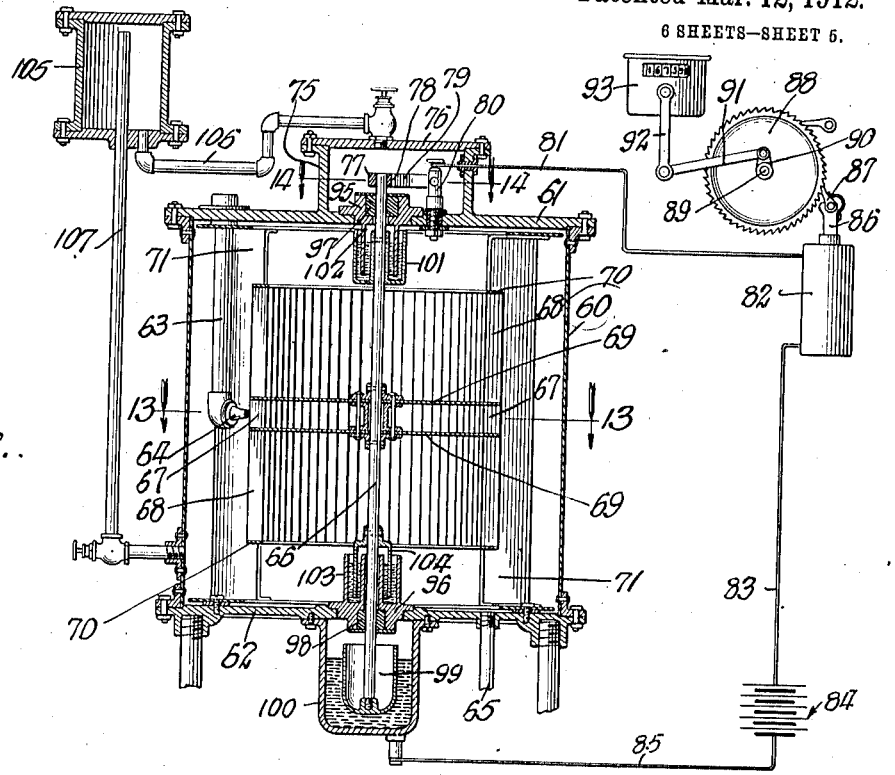
Figure 13:
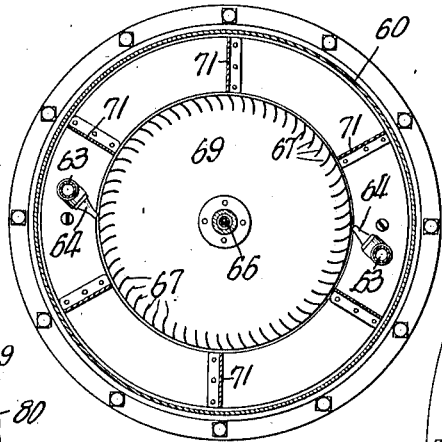
Figure 14:
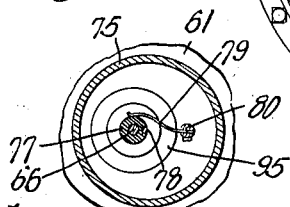
Figure 15:
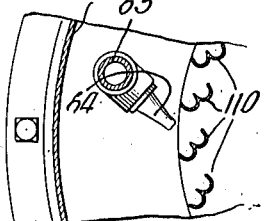

In the accompanying drawings:—Figure 1 is a view in central, vertical section of an apparatus embodying my invention. Fig. 2 is a horizontal section of the same, on a larger scale, taken on line 2—2 of Fig. 1. Fig. 3 is a detail view in perspective of the series of connected stationary blades within the casing of the apparatus. Fig. 4 is a detail perspective view of the rotative member or rotor of the apparatus, with its supporting shaft. Fig. 5 is a detail section of the said rotative member, taken axially through the same and its supporting shaft. Fig. 6 is a transverse section taken on line 6—6 of Fig. 5. Fig. 7 is a detail sectional view taken on line 7—7 of Fig. 1, and showing in plan view the top of the casing of the apparatus. Fig. 8 is a view in central, longitudinal section, corresponding with Fig. 5, showing a modified form of construction in the rotative member of the apparatus. Fig. 9 is a detail cross-section, taken on line 9—9 of Fig. 8. Fig. 10 is a detail section of the lower bearing of the rotor-shaft, showing a modified form of flotation bearing. Fig. 11 is a view in side elevation, showing the casing and oil reservoir and illustrating an arrangement of pressure-equalizing pipes employed in an apparatus such as is shown in Figs. 1 and 2 when the same is employed for measuring the flow of steam. Fig. 12 is a view in central, vertical section of another form of apparatus embodying the main features of my invention adapted for use in measuring gases. Fig. 13 is a detail cross-section taken on line 13—13 of Fig. 12. Fig. 14 is a detail section taken on line 14—14 of Fig. 12. Fig. 15 is a detail section showing one of the nozzles illustrated in Fig. 13 in connection with rotor-buckets of a different form. Fig. 16 is a view in central, vertical section of still another form of my invention in which the rotor has the form of a reaction jet-motor. Fig. 17 is a detail section taken on line 17—17 of Fig. 16.

First referring to the form of apparatus shown in Figs. 1 to 7, the same is designed for measuring the flow of water or other liquids, and consists in general of a motor of the impact type, the wheel or rotor of which is provided with blades or buckets and also with a series of blades forming the load or resistance member of the apparatus. The rotor thus made rotates in the body of liquid to be measured. As shown in said figures, the casing of the apparatus consists of an upright cylinder 5 provided with top and bottom heads 6 and 7. The liquid to be measured enters the casing through two supply pipes 8, 8 which extend through the cylinder 5 at opposite sides thereof and terminate in tapered, horizontally arranged discharge nozzles 9, 9. The liquid passes from the casing through a discharge pipe 10, the flow of the liquid through the casing being continuous during the operation of the apparatus. Centrally within the casing is an upright rotative shaft 11, carrying the rotor or rotative member of the apparatus, which embraces a series of annularly arranged blades or buckets 12, 12, 12 that are acted upon by the jets of liquid from the nozzles 9, 9 and two annularly arranged series of blades or wings 13, 13. The blades or buckets 12, 12, 12, together with the nozzles 9, 9, constitute the operative elements of an impact motor, said blades and nozzles being arranged obliquely with respect to radial lines of the rotor, and the nozzles being so arranged that the jets delivered thereby act by impact on the said blades to give rotative movement to the rotor, as common in like impact motors. Said nozzles have converging parallel-discharge orifices, the bores of said nozzles being conical in their tapered parts and terminating in cylindric orifices at their discharge ends; nozzles of this form having a substantially constant co-efficient of discharge under a varying pressure head. The two sets of blades 13, 13 of the rotor rotate with the motor blades 12, 12, 12 within the body of liquid contained in and passing through the casing, and constitute a load-member or fluid-brake which furnishes resistance to oppose the torque of the motor. As the torque of the motor-member is proportional to the pressure head, or to the square of the velocity of the fluid, and the resistance torque of the load-member is proportional to the square of its revolutions per unit of time, the rotor will turn at such speed that the resisting torque will to a large degree counterbalance the motive torque so that the rotor will turn at a moderate rate while at the same time the resulting rate of rotation of the rotor will be proportional to the volume of fluid flow through the apparatus, irrespective of variation of pressure or density of the fluid being measured, except for variation in frictional resistance due to the turning of the rotor at varying speeds, which resistance is reduced to a minimum and made practically constant by the friction-minimizing devices hereinafter set forth. In the particular construction in the rotor shown in said Figs. 1 to 7, the same embraces two parallel sheet metal disks 14, 14 which are secured to the shaft 11 and the motor blades 12, 12 are affixed to and extend between the marginal parts of said disks; the said disks and the blades or buckets therein constituting the wheel or rotative motor-member of the impact motor. The load-member blades 13, 13 are arranged radially and consist of upright plates that are inserted through the said disks 14, 14 and extend above and below the same; the upper and lower ends of said plates being secured to flat sheet metal rings 15, 15.

In order to prevent the body of liquid within the casing from acquiring a rotary motion with the rotor as the latter turns, annularly arranged, stationary radial blades 16, 16, 16 are located within the casing exterior to the rotor, as clearly seen in Fig. 2. Said stationary blades are shown as extending from top to bottom of the casing and as extending from the wall of the cylinder 5 inwardly with their inner upright edges adjacent to the rotor. Said stationary blades, by holding from rotary motion the body of liquid surrounding the rotor, greatly increase the resistance to rotation produced by the action on the liquid of the load-member blades. For convenience of construction, the stationary blades 16, 16, 16 are shown as attached at their upper and lower ends to flat rings 17, 17, thereby forming a cage or frame which is inserted, as a whole, into the casing and is secured by screws or otherwise to the lower head 7 of the said casing.

At the top of the main casing is an oil-chamber formed by means of an auxiliary casing consisting of a cylindric wall 20 which rises from the upper head 6 of the main casing, and a cap-plate 21 secured to the wall 20. Said oil-chamber is kept filled with oil and contains a train of gears, which is driven by the motor-shaft 11, which latter extends at its upper end into said oil-chamber and which operates a registering device located outside of the casing. The said shaft 11 passes upwardly through a hole in the top wall 6 into the oil-chamber and in its part within the same is provided with a worm 22 which intermeshes with and actuates a worm wheel 23 forming part of the train of gears referred to. As illustrated, the worm wheel 23 is attached to a horizontal shaft 24 which has geared connection with a second horizontal shaft 25 through the medium of a gear pinion 26 on said shaft 24 and a gear-wheel 27 on said shaft 25. The shaft 25 passes outwardly through a stuffing box 28 in the wall 20 to the outside of the oil-chamber. A register or rotating counter 30, of familiar construction, is mounted on the top wall 6 of the main casing and is operated from the shaft 25 through the medium of a crank-arm 31 on said shaft, and a connecting rod 32 which is engaged with said crank-arm and with an oscillating crank-arm 33 forming part of the registering device. The said register or counter will be operated to turn the units disk thereof one space or units distance at each rotation of the shaft 25 so that said register will indicate the number of rotations of the rotor per unit of time. The quantity or volume of fluid which passes through the nozzles to effect each rotation of the rotor being easily determined, it follows that the device may be constructed to directly indicate the total quantity of liquid which flows through the apparatus in a given time, expressed in any desired unit of measurement.

The bearing for the upper end of the rotor shaft 11 consists of a bearing plug 35 which is inserted through and has screw-threaded connection with the cap 21 of the oil-chamber; the said shaft having a conical upper end engaging a conical recess in the lower end of the bearing plug. Said bearing plug may be adjusted vertically by turning it in the cap 21 and a jam nut 36, applied to its screw-threaded upper end and bearing on the top surface of the said cap, locks or holds the same from turning or shifting when adjusted. The said bearing plug is provided with a central longitudinal bore or passage extending therethrough, through which oil is fed from its upper end to lubricate the bearing surfaces of its conical recess and the upper end of the motor-shaft. Oil is supplied to the passage in said bearing plug and also to the oil-chamber (which is kept filled with oil as before stated) by means of a supply pipe 37 receiving its supply of oil from a reservoir 38. A valve 39 is provided in the pipe 37 to control the flow of oil or lubricant from the reservoir to the oil-chamber. Said pipe 37 is connected with a cup-shaped shell 40 which is attached to the top of the cap 21 by a screw-threaded connection and forms an auxiliary oil-chamber surrounding the upper end of the bearing plug 35. Said auxiliary oil-chamber is connected with the main oil-chamber by means of holes or passages 41, 41 formed in the cap 21. It follows that the oil or other lubricant supplied to the oil-chamber by the pipe 37 reaches the upper bearing of the rotor-shaft through the bearing plug 35 and also fills the main oil-chamber, so that the said upper bearing, as well as the parts constituting the train of gears described, are immersed or run in an oil bath. The purpose of the oil reservoir is to supply oil to the gear case to take the place of oil that may escape therefrom by leakage or otherwise.

The hole in the top wall 6 of the main casing, through which the motor-shaft 11 passes, as hereinbefore stated, is larger than the said shaft so that the latter passes freely therethrough and has no frictional contact with said top wall, and in order to isolate the body of oil in the main oil-chamber from the water or fluid contained in and passing through the casing, a mercury seal is provided as follows: 42 indicates an annular trough or cup which surrounds and is secured to the motor-shaft below the top wall 6; the inner cylindric wall of said trough surrounding and fitting closely upon the said shaft. Said trough 42 contains a quantity of mercury, as shown in Fig. 1. Attached to the said top wall 6, and surrounding the motor-shaft, concentrically therewith, is a cylinder 43 which depends from said top wall and dips into the mercury in the annular trough or cup, without contact with the latter. By this construction, the motor shaft is adapted to freely rotate without frictional contact with any part of or upon the top plate 6, while at the same time the body of mercury forms a seal to prevent passage of oil to the interior of the main casing or the passage of fluid from the latter to the oil-chamber.

At the lower end of the rotor-shaft 11 a bearing is provided therefor on the lower head 7 of the casing with which is associated a mercury seal to isolate from the fluid being measured the lubricant supplied to said bearing, together with means for supporting the weight of the rotor-shaft and attached parts by flotation. These features are constructed as follows: The bottom wall or head 7 is provided with a central, circular opening and attached to the head around said opening is a cylindric, depending cup or shell 45, which is closed at its bottom and forms a depression or well at the center of the said head. Centrally within the cup 45, and rising from the bottom thereof, is secured a bearing post 46 provided in its upper end with a conical bearing recess for the lower end of the rotor-shaft, which lower end is made of conical form to engage said recess. Attached to said shaft near its lower end is an inverted cup or bell 47, which is made hollow, or of trough form, so as to constitute a float. Said bell 47 surrounds the shaft and extends from its point of attachment downwardly into the space between the bearing post 46 and the surrounding wall of the cup 45. The said cup 45 contains a body of mercury into which dips the bell 47 so as to form a mercury seal by which the fluid in the casing is prevented from reaching the space within said bell, surrounding the lower shaft-bearing. To provide for supplying oil to the said lower bearing, the shaft 11 is made hollow or tubular, and near its upper end is provided with a lateral aperture 48 through which lubricant from the oil-chamber may enter the passage in the shaft. At its lower end, below the point at which the bell 47 is attached thereto, and above its conical lower end, the said shaft is provided with a lateral aperture 49 through which oil passing downwardly through the shaft escapes into the space within said bell 47 and above the body of mercury. A body of oil is thus retained in the space referred to, in which body of oil the lower shaft bearing is constantly immersed; the mercury seal preventing the escape of said body of oil and isolating it from the fluid contained in the main casing.

The bell 47, of trough form as described, is made of thin or sheet metal and, by reason of the greater gravity of the mercury in which its lower part is immersed as compared with that of the water or fluid in the casing, constitutes a float having a tendency to lift the rotor-shaft to which it is attached. A quantity of mercury will be introduced into the cup or well sufficient to fill the same to such point that the upward pressure exerted thereby on the hollow bell or float 47 will be sufficient to counteract or counterbalance the gravity of the rotor-shaft and parts thereunto attached. The lower shaft-bearing may therefore be relieved of the weight of said parts and the said shaft made to engage with equal pressure its bearings at its upper and lower ends. The bearing plug 35 will be so adjusted that both ends of the shaft will be held by their bearings from lateral shifting movement, without any substantial endwise pressure on said bearings, so that frictional resistance to the turning of the shaft will be so slight as to be inappreciable in the usual operation of the apparatus, it being of course, understood that the frictional resistance to the turning of the shaft, due to the turning of the parts constituting the mercury seals at the top and bottom of the shafts, in or relatively to the bodies of mercury constituting said seals will be so slight as to be negligible.

In order to avoid the necessity of employing a mercury seal of undue or inconvenient depth between the rotor-shaft and the top wall 6 of the casing, such as might be necessary in cases in which the fluid to be measured is supplied under a considerable head or pressure, or where there are extreme variations of pressure within the casing, provision is made for equalizing the pressure between the main casing containing the fluid to be measured and the secondary casing or oil-chamber containing the lubricant, as follows: The oil-reservoir 38 constitutes a part of such pressure equalizing means, and said reservoir is connected with the interior of the main casing by means of a pipe 50. In the apparatus illustrated in the figures of the drawings referred to, which is designed for use in connection with water or other fluid heavier than oil, the pipe 50 is connected with the bottom wall of the main casing and opens into the bottom of the oil-reservoir 38, while the supply pipe 37 is connected with or opens from the top of said oil reservoir. In this particular arrangement of the parts, the oil in the reservoir will be subject to the same pressure as that within the casing, the water (or other liquid heavier than oil) rising through the equalizing pipe 50 and acting on the bottom of the body of oil in the reservoir to force the same from the reservoir into the oil-chamber, which latter will be subject to the same pressure as that in the main casing. By the use of the pressure equalizing devices described, therefore, the pressure on both sides of the upper mercury seal will be the same, and the seal used be deep enough only to insure the desired separation of the liquid being measured from the oil, without liability of the seal being "blown" or forced by an excess of pressure on either side thereof. The equalizing device described also takes care of any expansion or contraction of lubricant in the oil-chamber.

In Figs. 8 and 9 of the drawings is shown a form of construction in the details of the rotor-differing somewhat from that illustrated in Figs. 1, 2, 4, 5 and 6. In this instance, the blades 12, 12, 12 of the motor-member are attached to two rings 52, 52 which are attached to and supported by radial plates, forming the blades 13, 13 and said plates are separately supported from the rotor-shaft 11 by radial arms 53 on a central hub 54; the upper and lower ends of said plates being attached to flat metal rings 55, 55. In this form of rotor, by reason of the omission of the disks 14, 14 shown in Figs. 1, 2, 4, 5 and 6, the entire area of the plates forming the two sets of blades 13, 13 is adapted to act on the fluid in which the rotor turns, so that a greater degree of resistance is obtained than in the use of the two disks 14, 14, which latter prevent the circulation of the fluid within the spaces between the said disks, inside of the motor blades 12, 12, 12.

In Fig. 10 is shown a modified form of construction in the flotation device by which the weight of the rotor-shaft and rotor is taken from the lower bearing of said shaft. In this instance an annular or cylindric float 56 of hard rubber is employed in place of the hollow metal trough which forms the body of the bell 47, as shown in Fig. 1. As illustrated in said Fig. 10, the cylindric float 56 is mounted on a metal sleeve 57, which is attached at its upper end to a hub 58, secured to the shaft 11. Said sleeve has at its lower end a screw collar or nut 59 by which the float is held on said sleeve. In other respects the construction in the lower shaft bearing shown in Fig. 10 is generally like that shown in Fig. 1. The bearing post 46 is, however, in this instance provided with an oil passage 160 which enters the side of the post near its top and rises to the bottom of the conical bearing recess in the upper end of the post. The oil passage 160 permits oil from the body of oil surrounding the bearing to have direct access to the bearing surfaces of the post and shaft.

In Fig. 11 is shown an arrangement of the oil reservoir, the supply pipe 37 and the equalizing pipe 50 adapted for use in an apparatus employed for measuring the flow of steam. In this instance the supply pipe is connected with the top of the oil reservoir, as before, but the pipe 50 is connected with the cylindric wall 5 of the main casing above the bottom of the latter, and said pipe opens at its upper end near the bottom of the oil reservoir; the same being shown as passing downwardly through the top wall of the reservoir to a point near the bottom thereof. In this arrangement of the parts, the oil within the reservoir floats on top of the water of condensation which enters the reservoir from the equalizing pipe, while the pressure of the steam, acting on the oil in the reservoir, maintains the same pressure in the oil chamber as that in the main casing.

In Figs. 12, 13 and 14 of the drawings is illustrated a form of apparatus embodying the main features of my invention, adapted more particularly for measuring the flow of gases. As shown in these figures, the casing of the apparatus consists of a sheet metal cylinder 60 provided with cast-metal top and bottom heads 61 and 62. The gas enters the casing through two inlet pipes 63, 63, which pass through and depend from the top head 61 and terminate at their lower ends in horizontally arranged nozzles 64, 64. The gas passes from the casing through a discharge pipe 65 connected with the bottom head 62. 66 indicates an upright rotor-shaft which has bearings at its ends in the upper and lower heads and carries a rotor which embraces an annularly arranged set of motor blades or buckets 67, arranged in position for the action thereon of the jets from the nozzles 64, 64, and two sets of annularly arranged resistance or load-member blades 68, 68, arranged one set above and the other set below the said motor blades. The motor and resistance blades consist of continuous strips of metal which are transversely curved with their concave sides facing in the direction of motion of the rotor. The jets from the nozzles act on the convex sides of the central parts of the strips, which constitute the motor blades, while the concave sides of the upper and lower parts of said strips, constituting the load member blades 68, 68, act on the body of gas in the casing. The said strips are supported from the shaft 66 by means of two disks 69, 69, and their upper and lower ends are joined by flat rings 70, 70, the parts of said strips which form the motor blades 67, 67 being located between the margins of the disks 69, 69. In the casing exterior to the rotor are located radial, stationary blades or wings 71, 71, 71, which act to prevent rotary motion of the gas within the casing with the rotor. The design of the resistance or load-member blades illustrated, known as the "sirocco" type, has the advantage of affording maximum resistance torque in a wheel or rotor of given diameter.

The registering means provided for the apparatus shown in said Figs. 12, 13 and 14, is electrically operated, and embraces features as follows: On the top of the main casing is an oil chamber formed by means of a cylindric wall 75, cast integral with the head 61 and a cap 76, which closes the top of the oil-chamber. The shaft 66 shown as made hollow except at its upper end to save weight extends through its bearing in the head 61, into the oil-chamber, and is provided with a rigidly attached disk 77 of insulating material provided in its cylindric surface with a metal contact strip 78 which is in metallic connection with the shaft. A spring arm or brush 79 is attached to a fixed post 80, and presses or bears on the said disk 77 as the shaft rotates. The post 80 is insulated from the casing and has attached to it a conducting wire 81 which passes through an insulating bushing in the wall 75 of the oil chamber. The wire 81 leads to one terminal of a solenoid 82, the other terminal of which is connected by a conducting wire 83 with a battery or generator 84, which latter is connected with the main casing by a wire 85. The endwise movable core or armature 86 of the solenoid 82, carries a spring pressed pawl 87 which is adapted to act upon a ratchet wheel 88, so as to turn the latter the distance of one tooth each time the armature of the solenoid is operated by the closing of the circuit through the battery and solenoid coil by the action of the disk 77. The shaft 89 of said ratchet wheel carries a crank-arm 90 which is connected by a connecting-rod 91 with the oscillating actuating arm 92 of a register or counter 93. The bearings 95 and 96 for the upper and lower ends of the shaft 66 are provided with graphite bearing rings 97 and 98, which serve to hold the shaft from lateral movement, but through which the said shaft is free to slide endwise. These graphite bearing rings will not necessarily require lubricating, and no means is shown for supplying lubricant thereto. The weight of the shaft and attached parts is in this instance supported by a cup-shaped float 99 which is attached to the lower end of the shaft which extends below the bearing 96 and floats in a body of mercury which is contained in a cup-shaped shell 100 attached to the lower head 62 of the casing. For preventing the passage of gas from the casing to the oil chamber above it, and for preventing the escape of oil past the upper bearing 95 to the interior of the casing, a mercury seal is provided below said upper bearing consisting of an annular trough 101, which surrounds and is attached to the shaft 66, and a cylindric flange 102, which depends from the bearing 95 and has its lower edge immersed in a body of mercury contained in said trough 101. A mercury seal is also provided above the lower bearing 96 to isolate the lubricant supplied to said bearing from the gas within the casing. As illustrated, the bearing 96 is provided with concentric, annular flanges which rise therefrom to form an annular trough 103 which surrounds the shaft 66, and to the said shaft is attached an inverted cup or bell 104 which dips into a body of mercury contained in the said trough 103. The apparatus shown in said Figs. 12, 13 and 14 is provided with an oil reservoir 105, which is connected by a supply pipe 106 with the top of the oil-chamber and by an equalizing pipe 107 with the interior of the main casing. The supply pipe 106 communicates with the bottom of said oil reservoir, while the pipe 107 rises therein to a point near the top of the same. The gas which enters the reservoir from the casing occupies the upper part of the reservoir above the oil therein, which is subjected to the same pressure as that of the gas within said casing, as is also the body of oil which fills the oil chamber. The pressure in the casing and the oil chamber being thus equalized, there will be no liability of the breaking or "blowing" of the upper mercury seal by the gas pressure.

In Fig. 15 is shown a form of the rotative motor-member, in which the same is provided with rotative members 110 against which act the jets from the nozzles 64, and which have two concave recesses facing toward the nozzle, corresponding in shape with what are known as "Pelton" buckets.

As hereinbefore stated, my invention may be embodied in a form of apparatus embracing a motor acting by reaction as well as by impact. In Figs. 16 and 17 is illustrated a motor of the reactive type, or one in which rotary motion in the rotating member of the motor is produced by the reaction of jets escaping from rotative nozzles, the orifices of which are directed rearwardly with respect to the direction of motion of the nozzles. In said Figs. 16 and 17 the casing of the apparatus consists of a cylinder 115 provided with top and bottom heads 116 and 117. On the upper head is an oil-chamber formed by a cylindric extension 118 on the upper head, closed at its top by a cap 119. Attached centrally to the bottom head 117 is a depending cylindric extension 120, closed at its lower end by a cap 121, and opening at its upper end into the bottom of the casing. This form of apparatus is more especially intended for measuring the flow of liquids, and a pipe 122, by which the liquid enters the apparatus, is secured in a central aperture in the head 121, said supply pipe being extended upwardly within the extension 120 by means of an upright tube 123 preferably made separate from the pipe 122, and secured at its lower end to the cap 121.

The upright shaft 125 of the rotor in this instance extends at its upper end into the oil-chamber at the top of the casing and is provided at its upper part with vertically separated bearings 126, 127, by which the shaft is rotatively supported in its upright position. To the lower end of said shaft 125, within the casing is attached a hub 130 to which are secured two radial, tubular arms 131, 131, which are provided at their outer ends with horizontally arranged jet-nozzles 132, 132, the exit orifices of which are directed rearwardly with respect to the direction of rotation of the arms (Fig. 17). Said hub 130 is provided with a central, downwardly opening passage in communication with the tubular arms 131, 131, and attached to said hub is an upright tube 133 which extends downwardly therefrom into the annular space between the casing extension 120, and the upright inlet tube 123. This annular space contains a body of mercury, which forms a deep seal between the tubes 123 and 133, while permitting rotation of the rotative motor-member, consisting of the hub 130 and its arms 131, 131, without frictional contact with the casing or inlet tube.

Attached to the shaft 125, above the motor-member is a load or resistance member, consisting of a plurality of annularly arranged, radial blades, 134, attached to the outer ends of supporting arms 135 secured to the said shaft 125. A discharge pipe 136 is connected with the cylinder 115 for the passage of the liquid away from the casing. The casing is provided in this instance with a plurality of stationary, radial blades 137, 137, 137, located adjacent to the cylindric wall of the casing exterior to the paths of the arms 131, 131 and the blades 134, 134. Said blades 137, 137, 137 serve to prevent the liquid in the casing from partaking of the rotary movement of the rotor, as in the case of the like stationary blades hereinbefore described. This reactive form of meter operates generally in the same manner as does the impact type hereinbefore described, the torque of the motor-member, due to reaction of the jets, passing from the nozzles 132, 132, being opposed by the resistance torque due to the turning of the blades 134, 134 in the body of liquid contained in and passing through the casing of the apparatus.

The bearings 126 and 127 are supported in a tubular standard 140 which is attached at its lower end to the casing head 116 and rises within the oil-chamber. The bearings 126 and 127 have the form of antifriction ball-bearings, and the upper bearing 126 is a suspension bearing adapted to support or carry the weight of the shaft 125 and connected parts. Said upper bearing consists of a plate or disk 141 which is attached to the upper end of said shaft, a bearing ring 142 which is seated on an internal, upwardly facing, annular shoulder near the upper end of the hollow standard 140, and balls or rollers interposed between the downwardly and upwardly facing surfaces of said disk and ring. The lower bearing 127 is adapted to hold the shaft from sidewise movement only and consists of a plurality of balls placed in opposing grooves or ways formed in one case in the lower end of a sleeve 143 which surrounds and is secured to the upper part of the shaft, and in the other case in a ring 144 seated in the lower part of the said standard 140. A mercury seal is provided between the oil-chamber and the interior of the main casing, consisting of an annular trough 145, which is attached to the shaft 125 below the casing-head 116, and a concentric cylindric flange 146 having the form of a downward extension of the lower end of the standard 140, which dips at its lower edge into a body of mercury contained in the trough 145.

The sleeve 143 is shown as provided with a worm 147 which intermeshes with a worm wheel 148 contained within the oil-chamber. Motion may be transmitted from said worm wheel to a registering device by devices such as are shown in Figs. 1 and 7, or by any other suitable form of gearing.

An apparatus embracing the features of construction hereinbefore described constitutes a simple, accurate and self-contained integrating meter of the motor type, in which the number of revolutions per unit of time are (within practical limits) exactly proportional to the velocity of flow through the meter, and which is adapted for registering in units of volume the entire quantity of fluid which passes through it. Such an apparatus may be employed either to measure the entire quantity of fluid to be measured or by connecting the same with the by-pass from a "Venturi" tube, or from a nozzle or restricted orifice in a conduit as shown in my application, Serial Number 506,023 filed July 6th, 1909, may be used as a proportional meter to register the volume of flow through such conduit. Said apparatus, moreover, is accurate and positive at all rates of flow, is relatively powerful and yet operates at a reasonable speed, while the frictional resistance to rotation of the moving parts is made constant and so reduced as to form so small a part of the total resistance to motion as to become negligible with reference to its effect in producing inaccuracy in the meter. In other words the resistance afforded by the load or resistance member is so great in proportion to the friction of the moving parts, that the latter becomes negligible and the meter is accurate within practical limits.

One of the principal features of my invention is embraced in the construction by which the jet nozzles of the motor have parallel exit or throat walls and converging approach walls, or what may be called converging, parallel-discharge orifices, affording a substantially constant co-efficient of discharge for fluids of any density and at any rate of flow or pressure head, and a motor torque strictly proportional to the square of the velocity of discharge or rate of flow of the fluid to be measured, the motor embracing these features being associated with a load-member which turns with the motor-wheel and operates in a fluid, in the manner of a short-circuited centrifugal pump, to afford a resistance torque proportional to the square of the speed of rotation, for opposing the motive torque of the motor, and giving a relative slow rate of rotation in the rotating parts through which the register is operated. When such a load-member rotates in the fluid to be measured, the calibration becomes independent of fluid density, and the speed is strictly proportional to the volume or rate of flow. The reactive form of motor illustrated also has its nozzles provided with converging, parallel discharge orifices, so that its motive torque, as in the impact type of motor, is proportional to the square of the velocity of flow or pressure head.

Another important feature of my invention embraces, in connection with a load-member affording a large degree of resistance to oppose the torque of the motor, bearings for the rotating parts provided with anti-friction and lubricating means affording a frictional resistance so small in proportion to the resistance afforded by the load-member as to be practically negligible. Such means include the liquid seals for isolating the lubricant from the fluid being measured, floats for wholly or partially sustaining the weight of rotating parts, means for maintaining a constant supply of lubricant to the bearings, and means for equalizing the pressure between the space within the casing and the oil-chamber containing the lubricant.

It is to be understood that the several features of my invention may be embodied in structures differing variously from the specific forms of apparatus illustrated and hereinbefore set forth, and I do not, therefore, desire to be limited to the specific forms or details of construction illustrated and described, except so far as the same may be pointed out in the appended claims as constituting parts of my invention.

I claim as my invention:—

1. In an integrating fluid meter, the combination of a motor embracing a jet-nozzle through which is discharged the fluid to be measured and a rotor which is operated by the force due to the velocity of the fluid discharged through said nozzle, said nozzle having a uniformly converging, parallel-discharge jet-orifice affording a constant co-efficient of discharge, a rotative resistance-member connected and turning with said rotor, and a registering device operated by the rotor.

2. In an integrating fluid meter, the combination of a motor embracing a jet-nozzle through which is discharged the fluid to be measured and a rotor which turns on a vertical axis and which is provided with rigidly attached blades or buckets, said rotor being operated by the force due to the velocity of the fluid discharged through said nozzle and said nozzle having a uniformly converging, parallel-discharge jet-orifice affording a constant co-efficient of discharge, a rotative resistance member rigidly attached to and turning with said rotor, and a flotation bearing for said rotor consisting of a body of liquid having greater density than the fluid to be measured, and a float rigidly connected with the rotor and resting in said body of dense liquid.

3. In an integrating fluid meter, the combination of a motor embracing a jet-nozzle through which is discharged the fluid to be measured and a rotor which turns on a vertical axis and is provided with rigidly attached blades or buckets, said rotor being operated by the impact against said blades or buckets of the fluid to be measured as it is discharged from said jet-nozzle, an upright shaft carrying said rotor, and a float bearing for said shaft embracing a body of liquid having greater density than the fluid to be measured, and a float attached to said shaft and resting in the said body of dense liquid.

4. In an integrating fluid meter, the combination of a casing, a motor within the casing embracing a rotor turning on a vertical axis, and a horizontally arranged jet-nozzle, said rotor being actuated by the discharge through said nozzle of the fluid to be measured, a resistance-member embracing a plurality of blades attached to and turning with said rotor, and a plurality of fixed blades surrounding the said rotor within the casing.

5. In an integrating fluid meter, the combination of a casing, a motor within the casing embracing a jet-nozzle and a rotor operated by the discharge of the fluid being measured through said jet-nozzle, an upright rotor-shaft, and a bearing for said shaft adapted to hold said shaft from lateral movement and to receive a lubricant, said bearing embracing a body of dense liquid forming a liquid-seal for isolating the lubricant from the liquid being measured, and a flotation device for sustaining the weight of said shaft and attached parts, embracing a float which rests in the said body of dense fluid.

6. In an integrating fluid meter, the combination of a casing, a motor within the casing embracing an upright, rotative shaft, a jet-nozzle, and a rotor mounted on said shaft and operated by the force due to the velocity of the fluid discharged through said jet-nozzle, an oil-chamber located above the casing, a wall separating said oil chamber from the interior of the casing, said wall being provided with an aperture, the upper end of said shaft extending through said aperture into said oil-chamber, and a liquid-seal formed by fixed and rotative members, one on the said wall and the other on said shaft, and a body of dense liquid, said liquid-seal acting to separate the lubricant in said oil-chamber from the liquid in the casing.

7. In an integrating fluid meter, the combination of a casing, a motor within the casing embracing an upright shaft, a jet-nozzle, and a rotor mounted on said shaft and operated by the force due to the velocity of the fluid discharged through said jet-nozzle, an oil chamber located above the casing, a partition separating said oil chamber from the interior of the casing, said partition being provided with an aperture, the upper end of said shaft extending through said aperture into the oil-chamber, a bearing for the said shaft located in said oil-chamber, a liquid-seal formed by fixed and rotative members, one on said wall and the other on said shaft, and a body of dense liquid, said liquid-seal separating the lubricant in said oil-chamber from the fluid in the casing.

8. In an integrating fluid meter, the combination of a casing, a rotor within the casing, an upright rotor shaft, bearings on the casing for the said shaft, and a flotation device for sustaining the weight of said shaft and attached parts, embracing a body of liquid having greater density than the fluid to be measured, and a float attached to the shaft and resting in said body of dense liquid.

9. In an integrating fluid meter, the combination of a casing, a rotor within the casing, an upright rotor shaft, bearings on the casing for said shaft, and means for sustaining the weight of said shaft and attached parts by flotation, consisting of a cup, a float of annular form attached concentrically to the shaft, and a body of dense liquid within the cup; said float resting in said body of dense liquid.

10. In an integrating fluid meter, the combination of a casing, a motor within the casing, an upright motor shaft, and a combined bearing and liquid-seal for the lower end of said shaft, consisting of a cup on the bottom wall of the casing, a post rising from the bottom of said cup on which the lower end of the shaft is supported, and a bell attached to the shaft and extending downwardly into the annular space between the said post and the side wall of the cup.

11. In an integrating fluid meter, the combination of a casing, a motor within the casing, an upright motor shaft, an oil-chamber above the casing into which the upper end of the shaft extends, and a combined bearing and liquid seal for the lower end of the shaft, consisting of a cup on the bottom wall of the casing for holding a body of liquid, a post rising from the bottom of said cup on which the lower end of the shaft is supported, and a bell attached to the shaft and extending downwardly into the liquid in the space between said post and the side wall of the cup, said shaft being tubular and adapted to permit the passage of oil from said oil-chamber to the space within said bell and above the liquid in the cup.

12. In an integrating fluid meter, the combination of a casing, a motor within the casing, a motor shaft, a bearing for said shaft exterior to the casing, an oil-chamber in which said bearing is located, a liquid-seal between the casing and oil chamber, and means for equalizing the pressure between the said casing and oil-chamber.

13. In an integrating fluid meter, the combination of a casing, a rotor within the casing, a rotor shaft, a bearing for said shaft exterior to the casing, an oil-chamber in which said bearing is located, a liquid seal between the casing and oil-chamber, an oil-reservoir in communication with the oil-chamber, and means for equalizing the pressure between said oil-reservoir and the casing.

14. In an integrating fluid meter, the combination of a casing, a motor within the casing, an upright motor shaft, upper and lower bearings for said shaft exterior to the casing, and liquid-seals between said bearings and the casing.

15. In an integrating fluid meter, the combination of a casing, a motor within the casing, an upright, tubular motor shaft, upper and lower bearings for said shaft exterior to the casing, an oil-chamber surrounding the upper bearing and supplying lubricant to the lower bearing through said tubular shaft, and liquid-seals between said casing and said bearings.

16. In an integrating fluid meter, the combination of a casing, a motor within the casing, an upright, tubular motor shaft, upper and lower bearings for said shaft exterior to the casing, an oil-chamber surrounding the upper bearing and supplying lubricant to the lower bearing through said tubular shaft, liquid-seals between said upper and lower bearings and the interior of the casing, an oil-reservoir connected with said oil-chamber, and an equalizing pipe connecting said oil-reservoir with the main casing.

17. In an integrating fluid meter, the combination of a casing, a horizontally arranged jet nozzle, an upright rotor shaft, and a rotor embracing an annularly arranged series of plates within the casing and means rigidly connecting said plates with the said shaft; and said plates constituting both the blades or buckets of the rotor and also the blades of a resistance or load member.

18. In an integrating fluid meter, the combination of a casing, a horizontally arranged jet nozzle, an upright rotor shaft, and a rotor embracing an annularly arranged series of plates, and means rigidly connecting said plates with the said shaft; the central parts of said plates constituting the blades or buckets of the rotor, and the upper and lower parts of said plates constituting the blades of two resistance members.

In testimony that I claim the foregoing as my invention I affix my signature in the presence of two witnesses, this 23rd day of June, A. D. 1909.

EDGAR P. COLEMAN.

Witnesses:
 JOHN F. WHALEN,
 G. J. BRYCE.